United States Patent
Amdaa et al.

(10) Patent No.: US 8,938,933 B2
(45) Date of Patent: Jan. 27, 2015

(54) WALL SECTION FOR A WIND TURBINE TOWER AND WIND TURBINE TOWER

(75) Inventors: Abderrahim Amdaa, Brande (DK); Jan Jacobsen, Ebsjerg (DK); Steen Kirkegaard Jensen, Skanderborg (DK)

(73) Assignee: Siemens Aktiengesellschaft, Munich (DE)

(*) Notice: Subject to any disclaimer, the term of this patent is extended or adjusted under 35 U.S.C. 154(b) by 313 days.

(21) Appl. No.: 13/089,533

(22) Filed: Apr. 19, 2011

(65) Prior Publication Data

US 2011/0258952 A1 Oct. 27, 2011

(30) Foreign Application Priority Data

Apr. 21, 2010 (EP) .................................. 10160555

(51) Int. Cl.
*E04H 12/08* (2006.01)
*F03D 11/00* (2006.01)
*E04H 12/00* (2006.01)
*F03D 1/00* (2006.01)

(52) U.S. Cl.
CPC .............. *F03D 11/00* (2013.01); *E04H 12/003* (2013.01); *F03D 1/003* (2013.01); *F05B 2240/912* (2013.01); *Y02E 10/728* (2013.01); *Y02E 10/722* (2013.01)
USPC ............ 52/848; 52/651.01; 52/656.2; 52/834

(58) Field of Classification Search
CPC ....... E04H 12/00; E04H 12/08; E04H 12/085; E04H 2012/006; E04C 3/30; E04C 3/32; F03D 11/045
USPC ............ 52/834, 836, 843, 844, 845, 848, 40, 52/656.2, FOR. 126, FOR. 116, FOR. 128, 52/FOR. 129, FOR. 131, 651.01, 835
See application file for complete search history.

(56) References Cited

U.S. PATENT DOCUMENTS

| | | | | |
|---|---|---|---|---|
| 2,304,718 | A * | 12/1942 | Swart | 428/189 |
| 2007/0148004 | A1 | 6/2007 | Wernicke et al. | |
| 2007/0296220 | A1* | 12/2007 | Kristensen | 290/55 |
| 2008/0236073 | A1* | 10/2008 | Bagepalli et al. | 52/292 |
| 2009/0146008 | A1* | 6/2009 | Thiele | 244/119 |

FOREIGN PATENT DOCUMENTS

| | | |
|---|---|---|
| CN | 1592818 A | 3/2005 |
| CN | 101057074 A | 10/2007 |
| CN | 101065576 A | 10/2007 |
| CN | 101338726 A | 1/2009 |
| DE | 43 33 553 A1 | 4/1995 |
| DE | 10 2008 035 350 A1 | 2/2010 |
| DE | 20 2009 015 675 U1 | 4/2010 |
| GB | 2353825 A | 3/2001 |
| WO | WO 03/036085 A1 | 5/2003 |
| WO | WO 2006/050723 A1 | 5/2006 |

* cited by examiner

Primary Examiner — William Gilbert

(57) ABSTRACT

A wall section for a tower of a wind turbine is provided. The wall section includes an inner edge surrounding an opening of the wall section and a protrusion protruding in a thickness direction of the wall section and extending transverse to the thickness direction. Further a wind turbine tower is provided. The wind turbine tower includes a tower wall portion and a wall section as described above. The wall section is connected to the tower wall portion at least at a portion of an outer edge of the wall section.

15 Claims, 4 Drawing Sheets

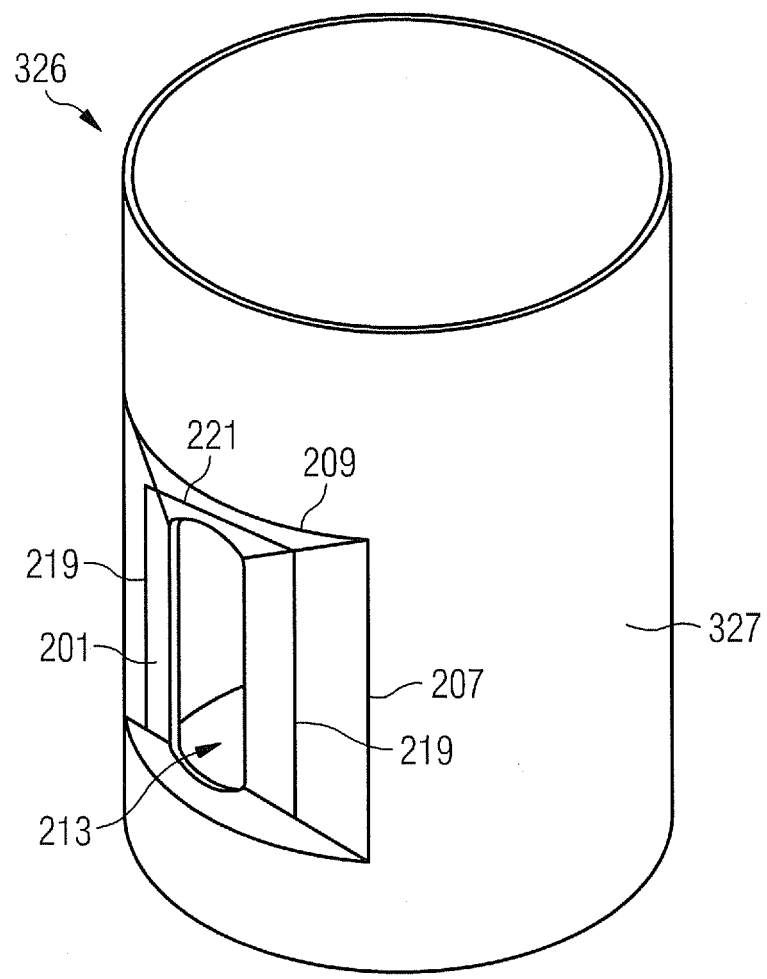

WALL SECTION FOR A WIND TURBINE TOWER AND WIND TURBINE TOWER

CROSS REFERENCE TO RELATED APPLICATIONS

This application claims priority of European Patent Office application No. 10160555.8 EP filed Apr. 21, 2010, which is incorporated by reference herein in its entirety.

FIELD OF INVENTION

The present invention relates to a wall section for a wind turbine tower and to a wind turbine tower. In particular, the present invention relates to a wall section for a wind turbine tower having a protrusion for increasing a stiffness of the wind turbine tower.

A wind turbine comprises a tower, a nacelle mounted at a top of the tower and a hub connected to the nacelle, wherein at the hub one or more rotor blades are mounted that transfer mechanical energy to a rotor shaft connected to a generator. At a bottom portion of the tower usually a door is provided for getting access to the inside of the tower for maintenance purpose. The door requires an opening within the wind turbine tower wall. The wind turbine tower wall is typically made from a metal, such as steel.

ART BACKGROUND

WO 2006/050723 A1 discloses a tower part for a wind turbine having an aperture suitable for installing a door. The tower part has a substantially uniform thickness and is thicker than the thickness of a wall segment of the tower to which the tower part having the aperture is mounted.

WO 03/036085 A1 discloses a structural unit for constructing a tower of a wind turbine, wherein the structural unit has a through opening for accommodating a door and wherein the structural unit is at least partially formed as cast part.

There may be a need for a wall section for a wind turbine tower having an opening suitable for accommodating a door which at the same time provides sufficient structural rigidity and stiffness in order not to reduce the stiffness of the wind turbine tower, when the wall section is used as a part of a bottom part of the wind turbine tower. Further, there may be a need for a wall section for a wind turbine tower having a reduced weight but providing a sufficient structural rigidity and strength to be suitable as a portion of a wind turbine tower shell.

SUMMARY OF THE INVENTION

This need may be met by the subject matter according to the independent claims. Advantageous embodiments of the present invention are described by the dependent claims.

According to an embodiment a wall section for a tower of a wind turbine is provided, wherein the wall section comprises an inner edge surrounding an opening of the wall section; and a protrusion protruding in a thickness direction of the wall section and extending transverse to the thickness direction.

The wall section may be configured to form a portion of a wind turbine tower or a portion of a wind turbine tower shell, in particular at a bottom portion of the wind turbine tower. The wall section extends primarily in two different lateral directions which are the directions of the maximal extent of the wall section. The wall section extends in a thickness direction transverse to the two lateral directions to a much smaller amount, wherein this amount represents a thickness of the wall section. The thickness in particular may be between 20 mm-100 mm, in particular between 20 mm and 75 mm, further in particular between 30 mm and 50 mm. The lateral extent in a vertical direction may be in between 200 cm and 400 cm, in particular around 300 cm and the lateral extent in the other lateral direction, in particular in a circumferential direction of the tower, may be in between 110 cm and 300 cm, in particular around 250 cm.

The wall section may comprise an outer edge comprising two vertical outer edges running in the vertical direction and comprising two circumferential outer edges running along the circumferential direction of the wind turbine tower. In a central portion of the wall section an opening is provided which is surrounded by an inner edge of the wall section. The inner edge may comprise two vertical inner edge portions running along the vertical direction and an upper inner edge and a lower inner edge delimiting the opening at an upper side and a lower side, respectively. The upper inner edge as well as the lower inner edge may have a curved shape (in particular a segment of a circle) or may have a straight shape.

Further, according to an embodiment, the wall section may comprise ventilation holes for ventilation, wherein a number of ventilation holes in the wall section may be between 1 and 20, in particular between 1 and 10, more in particular between 1 and 3 or more. The ventilation hole(s) may have a smaller size than the opening.

The opening may be configured to accommodate a door. The opening may be sized to allow a person traversing the opening (e.g. doorway) in an upright position. According to another embodiment a size of the opening may depend on the application. The size may e.g. be large enough to deliver large components (in particular between 2 m and 10 m in extent or between 2 m and 5 m in extent) into the interior of the turbine tower through this opening or carry these components out of the turbine through this opening.

The wall section may comprise mounting elements for mounting a door.

The protrusion may be formed as a rib, a bulge or a general support structure applied to the wall section. The protrusion may be designed to increase the stiffness or structural rigidity of the wall section. Disregarding the protrusion the wall section may have a uniform thickness. The protrusion may provide a reinforcement or a backing of the wall section such as to compensate for a reduced stiffness due to the opening in a central part of the wall section. Thereby, the wall section is well-suited to be used as a shell portion for a wind turbine tower without adversely affecting the structural rigidity and stiffness of the wind turbine tower.

The protrusion may have a thickness and/or a width of 1 mm to 200 mm, in particular 20 mm-60 mm, in particular 30 mm-50 mm, in particular about 40 mm. The protrusion may in particular comprise a metal, such as steel. The protrusion may be fixed to the wall section, such as by using bolts or by welding. According to other embodiments, the protrusion (the one or more protrusions) are integrally formed with the wall section, such as by casting the wall section including the protrusion. The opening may be cut out after casting the wall section. Alternatively the wall section may comprise a manufacturing step of rolling a metal, bending the metal and mounting the protrusion at the band metal. Thereby, manufacturing costs may be reduced, while at the same providing a wall section suitable for integrating into a wind turbine tower.

According to an embodiment the geometry, the material, the size, and the arrangement of the protrusion may be derived from computer-modelling calculations.

According to an embodiment the protrusion extends transverse to the thickness direction parallel to a portion of the inner edge and/or parallel to a portion of an outer edge of the wall section. Thereby the protrusion may provide a circumferential (horizontal) rib reinforcement and may also provide a vertical rib reinforcement and/or diagonal reinforcement of the wall section. In particular, the protrusion may be arranged spaced apart from the outer edge of the wall section and may be arranged also spaced apart from the inner edge of the wall section. The protrusion may for example be arranged in between the outer edge of the wall section and the inner edge of the wall section. Thereby, the rigidity and stiffness of the wall section may be improved and increased without increasing the overall thickness of the wall section thus reducing a weight of the wall section and also reducing costs of the wall section.

According to an embodiment the protrusion longitudinally extends between a portion of an outer edge and a portion of an inner edge of the wall section. In particular, the protrusion may extend up to the portion of the outer edge and/or up to the portion of the inner edge of the wall section. Thus, the protrusion may extend all the way from the portion of the outer edge to the portion of the inner edge. Thereby, especially in the region of the opening or in a region surrounding the opening the wall section is advantageously reinforced by the protrusion in order to increase its stiffness.

According to an embodiment the protrusion longitudinally extends between a portion of an outer edge of the wall section and another portion of the outer edge opposite to the portion of the outer edge of the wall section. In particular, the protrusion may extend all the way from the portion of the outer edge of the wall section to the other portion of the outer edge opposite to the portion of the outer edge of the wall section. Thus, the protrusion may extend across an entire lateral extent of the wall section in both lateral directions, i.e. the vertical direction and the circumferential (horizontal) direction. In other embodiments the protrusion does not extend across the entire lateral extent of the wall section but extend to about 60-80% of the lateral extent between the portion of the outer edge and the other portion of the outer edge of the wall section. Thereby, a weight can be reduced and at the same time in particular areas around the opening may be reinforced, to increase their stiffness and strength.

According to an embodiment the wall section further comprises a further protrusion arranged between the opening and a circumferential side portion of an outer edge, between the opening and a vertically upper portion of the outer edge and/or between the opening and a vertically lower portion of the outer edge. In particular, the further protrusion may provide additional reinforcement of the wall section. In particular, the further protrusion may surround the opening to effectively structurally support the wall section especially within regions surrounding the opening.

One or more additional protrusions may be provided protruding in a thickness direction of the wall section and extending in the vertical direction, the circumferential direction, and/or a direction between the circumferential direction and the vertical direction.

According to an embodiment the thickness of the wall section increases from the outer edge towards the inner edge of the wall section (and thus towards the opening). Thereby, the thickness of the wall section is determined without taking the thickness of the protrusion protruding in the thickness direction into account. Thus, the thickness of the protrusion does not count for determining the thickness of the wall section in this definition. The increase of the thickness from the outer edge towards the inner edge of the wall section may amount to 50-200%, in particular to 55-150%. Thus, the thickness of the wall section at the outer edge may amount to about 10 mm-70 mm, in particular 20 mm-50 mm, more in particular 25 mm to 40 mm, in particular about 32 mm and the thickness of the wall section at the inner edge may amount to 10 mm to 150 mm, in particular 75 mm-125 mm, in particular to around 100 mm. Thus, the thickness may increase from the outer edge to the inner edge by a factor of 1.5 to 4, in particular 2 to 3.5, in particular around 3. Thereby, the structural rigidity and stiffness of the wall section may be improved without requiring to increase the overall thickness of the wall section in a uniform way across the whole area of the wall section without hampering structural strength.

The cast wall section may have a plate thickness which may increase around the opening to create stiffness that has been lost due to the opening. By increasing the plate thickness little by little it may be exploited that a big moment of inertia of inner shell in all directions may be generated with little material, wherein this big moment of inner shell is especially concentrated around the opening.

According to an embodiment the wall section comprises a convex surface and a concave surface, wherein the protrusion is arranged at the concave surface. The concave surface may be the surface providing a portion of an inner surface of the assembled wind turbine tower. To arrange the protrusion at the concave surface may result in an enhanced structural rigidity and stiffness compared to arranging the protrusion at the convex surface.

According to an embodiment the wall section has a shape of a cylinder segment or a cone segment. In particular, the wall section may at least approximately have a shape of a cylinder segment or a cone segment. Thereby, the wall section may easily be inserted in a wind turbine tower shell. The cylinder may have a diameter of 200 cm-800 cm, in particular 350 cm-450 cm according to an embodiment.

According to an embodiment the wall section comprises a cast metal. The wall section may be assembled from a number of cast metal parts or may be manufactured as an integrally formed cast metal structure. Thereby, it is possible to simplify the manufacturing process, since the wall section must not be assembled from a number of parts which have to be fixed to each other. The cast wall section may have a shape suitable as a shell portion of a wind turbine tower shell and having a shape such that a protrusion is formed protruding in the thickness direction of the wall section.

According to an embodiment the cast metal comprises steel, in particular GS-20Mn5V steel according to DIN standard 17182 or steel having at least approximately equal properties to GS-20Mn5V steel or steel having at least approximately equal properties as S355 steel. Thereby the wall section manufactured from cast steel may be fully weldable to other wall segments of the wind turbine tower.

According to an embodiment the cast metal comprises steel having properties inferior to the aforementioned steel.

According to an embodiment the wall section further comprises at least one (or more, in particular 1 to 10) hole adapted for passage of air.

According to an embodiment a wind turbine tower is provided comprising an embodiment of a wall section as described above and comprising a tower wall portion, wherein the wall section is connected to the tower wall portion at least a portion of an outer edge of the wall section. By connecting the wall section to the tower wall portion at least a bottom portion of the wind turbine tower may be assembled. The outer edge of the wall section may comprise portions extending in the vertical direction and portions extending in the horizontal (circumferential) direction. The vertical direction may at least approximately be parallel to a symmetry axis of the wind turbine tower. The circumferential direction may be at least approximately perpendicular to the vertical direction. By using the wall section within a wind turbine tower wall or wind turbine tower shell the wind turbine tower may be manufactured in a simple way at the same time reducing costs.

According to an embodiment the tower wall portion is connected to the wall section by welding. Welding may be performed to connect at least a portion of the outer edge of the wall section to an edge of the tower wall portion. By welding a sufficiently strong connection between the tower wall portion and the wall section may be provided without requiring additional mounting elements. In an embodiment the wall portion is connected to the wall section using bolts or screws.

According to an embodiment the protrusion is adapted to compensate a reduction of a stiffness of the tower due to the opening in the wall section. In particular, the reduction of the stiffness may be compensated by at least (e.g. depending on capacity of wind turbine) 50%, in particular 75%, more in particular 90%, more in particular 100%, by providing the protrusion in the wall section. According to other embodiments the stiffness of the tower is even be enhanced (in particular by more than 10%) compared to a tower not having the wall section by providing the wall section having the protrusion in a lower part of the tower. Thus, the tower may be positioned in a rough environment having high wind speed.

According to an embodiment a manufacturing method for manufacturing a wind turbine tower is provided, wherein the method comprises manufacturing a wall section for a wind turbine tower, the wall section comprising an inner edge surrounding an opening of the wall section; and a protrusion protruding in a thickness direction of the wall section and extending transverse to the thickness direction, and assembling and mounting the wall section to a tower wall portion.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings.

FIG. 3 schematically shows a portion of a wind turbine tower having inserted a wall section for a wind turbine tower according to the embodiment illustrated in FIGS. 2A, 2B and 2C in a perspective view.

DETAILED DESCRIPTION

Figure 1A:
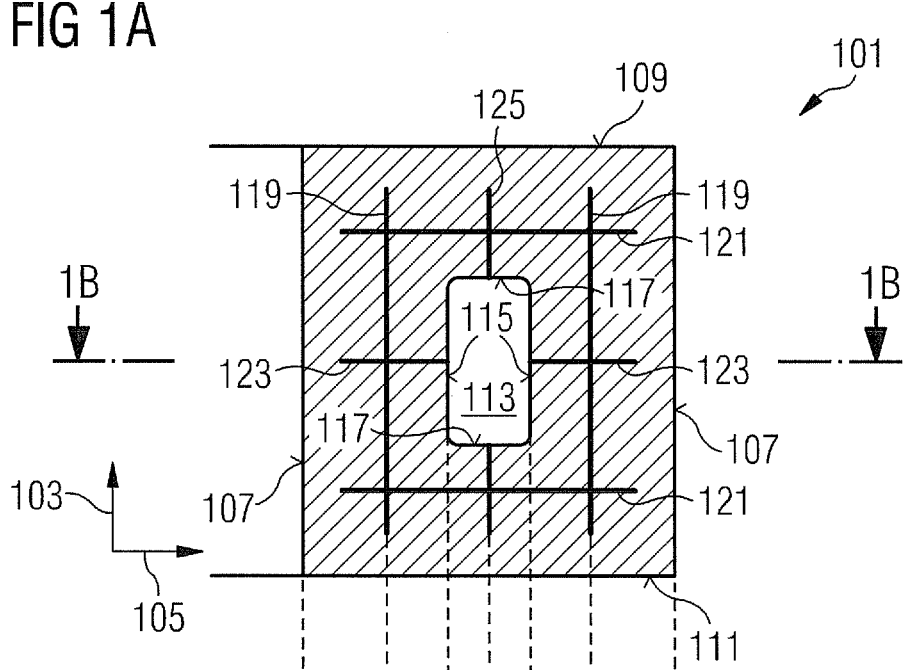
FIG. 1A schematically shows a side view of a wall section for a wind turbine tower according to an embodiment.

The illustration in the drawing is schematically. It is noted that in different figures, similar or identical elements are provided with the same reference signs or with reference signs, which are different from the corresponding reference signs only within the first digit.

FIG. 1A schematically shows a side view of a wall section 101 for a wind turbine tower according to an embodiment. In the illustrated embodiment the wall section is an integrally formed cast metal part which comprises steel GS-20Mn5V according to DIN standard 17182. This steel has properties similar to the material properties of steel S355 having a Young's module of 2.1 e5 MPa, Poisson's ratio of 0.3, a density of 7.85 e(−6) kg/mm$^3$, tensile yield strength of 355 MPa, and partial coefficient for steel of 1.2.

The wall section 101 illustrated in FIG. 1A comprises a plate-like structure extending in a vertical direction 103 and in a horizontal direction 105. The wall section 101 has two vertical outer edges 107, and upper horizontal edge 109 and a lower horizontal edge 111. In a central portion of the wall section 101 an opening 113 is provided having an appropriate size to allow a person to transverse the opening 113. The opening is surrounded by two vertical inner edges 115 of the wall section 101 and two horizontal inner edges 117 of the wall section 101.

A thickness direction of the wall section 101 runs perpendicular to the drawing plane of FIG. 1A. An extent of the wall section 101 in the horizontal direction 105 may depend on the application and may e.g. be between 100 cm and 500 cm, in particular between 200 cm and 300 cm or may have a different size. An extent of the wall section 101 in the vertical direction 103 may be between 250 cm and 350 cm. The thickness of the wall section in the thickness direction perpendicular to the directions 103 and 105 may be 20 mm-150 mm, in particular 30 mm-100 mm. According to an embodiment the thickness of the wall section (disregarding any protrusion provided at the wall section) is uniform across the entire wall section and has a thickness of 30 mm-50 mm. According to another embodiment the thickness (disregarding any protrusion) varies across the extent in the vertical direction 103 and the horizontal direction 105, wherein in particular the thickness of the wall section increases from the outer edges 107, 109, 111 towards the inner edges 115, 117 of the wall section 101. The outer edges 107, 109, 111 are straight edges. Also the inner edges 115, 117 comprise straight portions but comprise also rounded portions at positions where edges 115, 117 running perpendicular to each other are joined.

For increasing the stiffness of the wall section 101 the wall section includes a number of protrusions 119, 121, 123 and 125. The protrusions protrude in a thickness direction, i.e. perpendicular to the drawing plane of FIG. 1A from the wall section, thereby forming reinforcement ribs. The protrusions 119, 125 extend in a vertical direction 103, while the protrusions 121, 123 extend in the horizontal direction 105. In particular, the protrusions 119 extend between the upper horizontal outer edge 109 and the lower horizontal outer edge 111 of the wall section 101. The protrusions 125 extend from the horizontal inner edges 117 towards the horizontal upper outer edge 109 and the lower horizontal outer edge 111 of the wall section 101. The protrusions 121 are arranged above and below the opening 113 and extend between the vertical outer edges 107, wherein their extent amount to about 80% of the entire extent of the wall section in the horizontal direction 105. The protrusions 123 extend from the vertical inner edges 115 towards the vertical outer edges 107, but do not span the entire distance between the vertical outer edges and the vertical inner edges, but only about 70% to 90%. The protrusions may be considered as ribs or bulges that increase the mechanical stability of the wall section 101 in particular, they provide a reinforcement to increase the stiffness of the wall section 101.

Figure 1B:
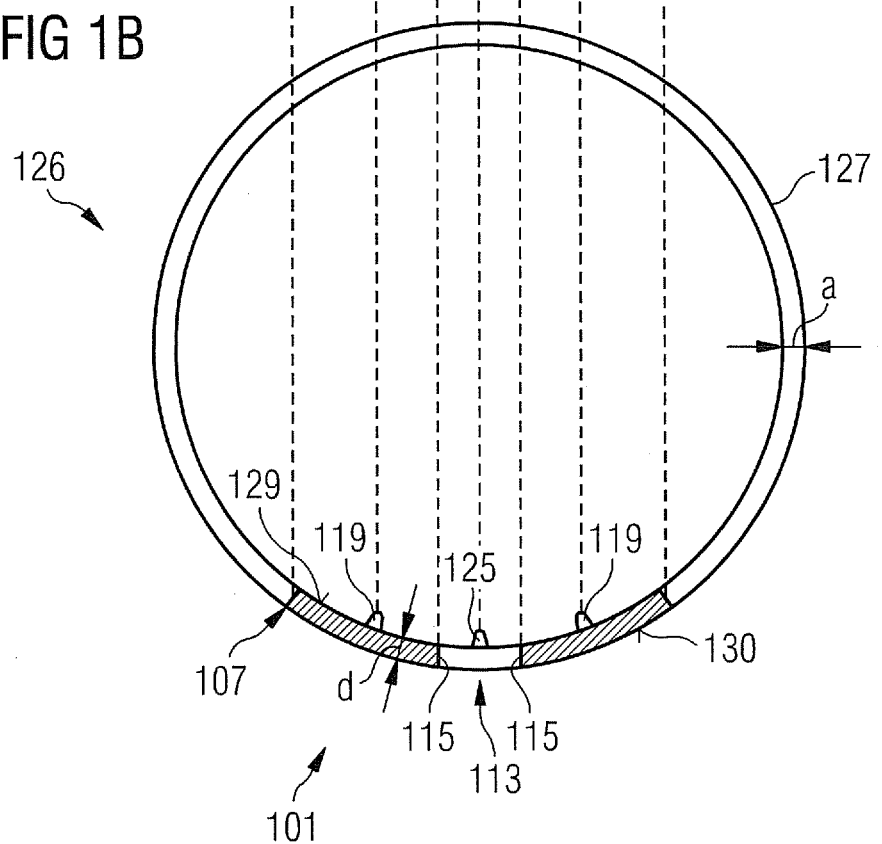
FIG. 1B schematically shows a cross-sectional top view of a wind turbine tower with an inserted wall section according to an embodiment.

FIG. 1B schematically shows a cross-sectional top view of the wall section 101 illustrated in FIG. 1A when integrated in a wind turbine tower 126. The wind turbine tower portion 127 is a segment of a cylinder having a circular cross-section. The diameter of the cylinder may amount to 350 cm to 450 cm. The thickness "a" of the cylinder segment 127 may be 30 mm-40 mm. The cylinder segment 127 may be formed from rolled steel.

The wall section 101 is welded to the cylinder segment 127 at the vertical outer edges 107. As can be seen in FIG. 1B, the protrusions 119, 125 of the wall section 101 are formed at the concave surface 129 of the wall section 101. The concave surface 129 represents a portion of an inner surface of the wind turbine tower 126. As can be seen from FIG. 1B the thickness "d" of the wall section 101 is uniform when disregarding the thickness of the protrusions 119, 125.

Other embodiments may comprise additional protrusions at different positions and running in different directions than the protrusions 119, 121, 123 and 125.

According to an embodiment the wall section 101 is not an integrally formed cast metal part but is manufactured by rolling steel, bending the steel and mounting the ribs onto the bent steel plate.

Figure 2A:
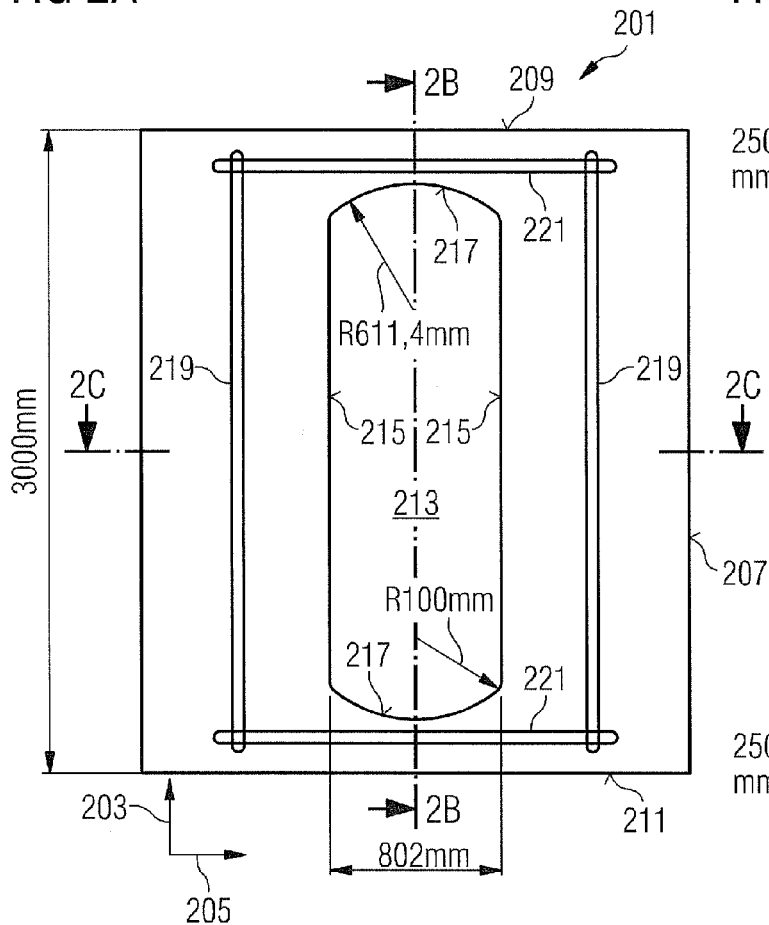
FIGS. 2A, 2B and 2C schematically illustrate a side view of a wall section for a wind turbine tower and cross-sectional views of the wall section according to an embodiment.

FIG. 2A schematically shows a side view of a wall section 201 according to an embodiment. The dimensions of the wall section 201 are given in the figure in units of mm. The opening 213 is delimited by two vertically extending inner edges 215 having a straight shape and two inner edges 217 having a shape of a circle segment having a radius of 611.4 mm. This particular roundish shape increases the stability of the wall section 201. Different from the embodiment illustrated in FIG. 1A the wall section 201 illustrated in FIG. 2A only comprises four protrusions 219 and 221 substantially surrounding the opening 213. Other embodiments include a larger number of protrusions for the wall section 201.

Figure 2B:
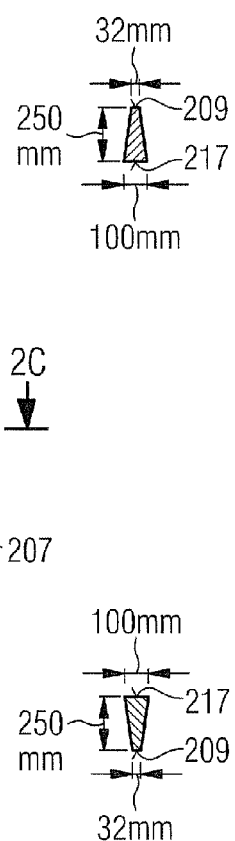
Figure 2C:
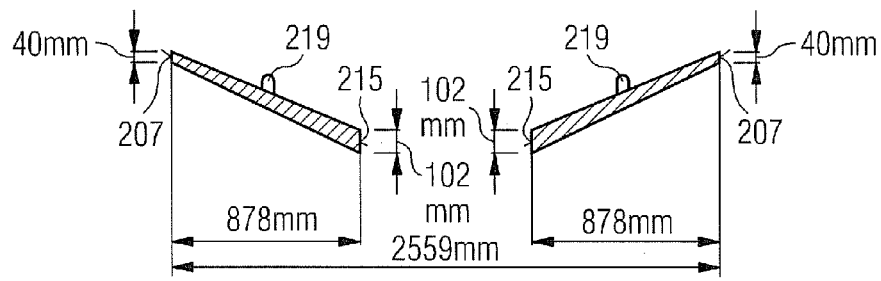

A difference of the embodiment of a wall section 201 illustrated in FIG. 2A to the embodiment of a wall section 101 illustrated in FIG. 1A and FIG. 1B is that the wall section 201 illustrated in FIGS. 2A, 2B and 2C has a varying thickness across the vertical direction 203 and the horizontal direction 205 such that the thickness in the thickness direction perpendicular to the drawing plane of FIG. 2A increases from the outer edges 207, 209 and 211 towards the inner edges 215 and 217 of the wall section 201. The profile of the wall section 201 is apparent from FIGS. 2B and 2C showing cross sectional views. It is apparent that the thickness increases from 32 mm at the outer edge 209 to 100 mm at the inner edge 217. Also, as is apparent from FIG. 2C the thickness of the wall section increases from 40 mm at the vertical outer edge 207 monotonically to 102 mm at the vertically inner edge 215. Thereby, the stiffness and structural strength of the wall section 201 is increased compared to a wall section having a uniform thickness of 32 mm or 40 mm. Further, the protrusions 219 and 221 enhance the mechanical strength of the wall section.

According to an embodiment the one or more protrusions may be applied to a convex surface of the wall section 101 illustrated in FIG. 1A and FIG. 1B or of the wall section 201 illustrated in FIGS. 2A, 2B and 2C.

FIG. 3 schematically illustrates a portion of a wind turbine tower 326 according to an embodiment. The wind turbine tower 326 comprises a segment 327 providing a wall structure or shell structure for the wind turbine tower. The segment 327 may have a cone-like shape or a cylinder-like shape. To provide access to the inside of the wind turbine tower 326 for maintenance personnel a wall section 201 illustrated in FIGS. 2A, 2B and 2C is welded at its edges 207, 209 to the tower segment 327. The maintenance personnel may then enter the inside of the tower 326 via the opening 213. The opening 213 may be closed by a door which may be rotatably connected to the wall section 201 by not illustrated mounting elements.

Figure 4A:
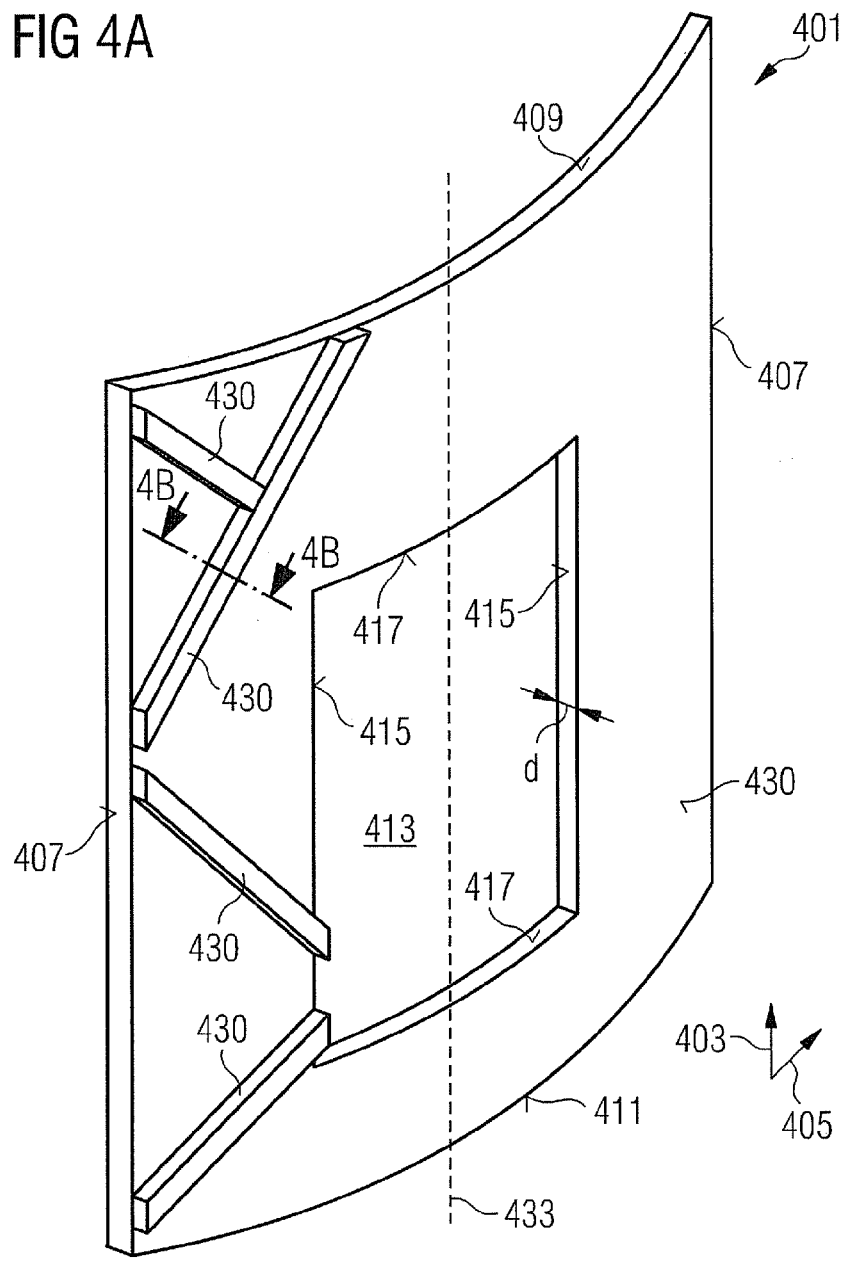
FIGS. 4A and 4B illustrate wall section for a wind turbine tower according to another embodiment.
Figure 4B:
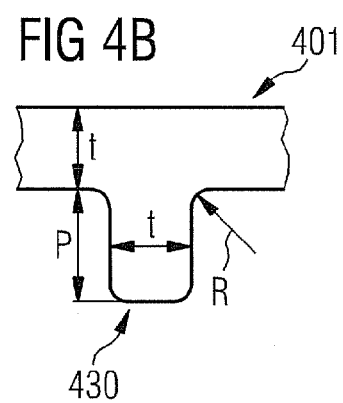

FIGS. 4A and 4B schematically show a wall section 401 according to another embodiment. The wall section 401 is similarly constructed as the wall sections 101 and 201 illustrated in FIGS. 1 and 2, but differs from these embodiments in that it comprises protrusions 430 that are arranged symmetrically to a symmetry axis (mirror axis) 433, wherein these protrusions 430 are arranged diagonally (i.e. in a direction between the vertical direction 403 and the horizontal direction 405). Thereby an inclination angle with the horizontal direction 405 may be between 20° and 70°, in particular between 30° and 60°, in particular around 45°.

As can be seen in the cross sectional view of FIG. 4B, the protrusion 430 protrude by an amount P from the wall section 401, wherein P may amount to between 30 mm and 80 mm, in particular around 60 mm. Further, the thickness t of the wall section 401 and the protrusion are of similar size, and may amount to between 30 mm to 50 mm, in particular to around 40 mm. An edge between the protrusion and the outer surface of the wall section is rounded having a radius R which may amount to between 30 mm and 50 mm, in particular 40 mm.

According to an embodiment the geometry, the manufacturing materials and other mechanical parameters of the wall section are optimized such that the wind turbine tower with the wall section inserted has a moment of inertia which is equal or higher than the moment of inertia for the tower without the opening. In particular, the three stiffnesses (displacement in the horizontal direction and two rotations around another horizontal direction and the vertical direction) may be used as constraints in a topology optimization, geometry optimization simulation. Further, casting constraints may be taken into account as well as symmetry constraints. Thereby, the shape optimization is adapted not to change the overall stiffness of the wind turbine tower. In particular, the simulation may be performed utilizing a finite element analysis. In particular, an effect of a shear force may be analyzed, as well as an effect of a bending moment, an effect of a torque applied about the vertical direction and an effect caused by deformation load. In particular, Von Mises Stress may be analyzed for different design layouts in order to select the design of the wall section showing the best performance.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A wind turbine tower, comprising:
   a tower wall portion; and
   a wall section comprising
      an inner edge surrounding an opening of the wall section, the inner edge including an inner top edge and an inner bottom edge;
      an outer edge including a top edge portion, a bottom edge portion, a first side edge portion and a second side edge portion; and
      a plurality of protrusions each protruding in a thickness direction of the wall section and extending transverse to the thickness direction, the plurality of protrusion includes a first protrusion and a second protrusion,
   wherein the first protrusion extends longitudinally and is arranged between the top edge portion and the inner to edge such that the first protrusion is above the opening,
   wherein the second protrusion extends longitudinally and is arranged between the bottom edge portion and the inner bottom edge such that the second protrusion is below the opening, and
   wherein each of the plurality of protrusions is adapted to compensate for a reduction of a stiffness in the wall section due to the opening in the wall section,
   wherein the wall section is connected to the tower wall portion at least at a portion of an outer edge of the wall section.

2. The wind turbine tower according to claim 1,
   wherein the first protrusion and the second protrusion each extends parallel to a portion of the inner edge of the wall section.

3. The wind turbine tower according to claim 1,
   wherein the first protrusion and the second protrusion each extends parallel to a portion of one of the side outer edges of the wall section.

4. The wind turbine tower according to claim 1,
   wherein the first protrusion and the second protrusion each extends transverse to the thickness direction and parallel to a portion of the inner edge and one of the side edge portions of the wall section.

5. The wind turbine tower according to claim 1,
   wherein the plurality of protrusions comprising:
   a first further protrusion extending between the opening and a circumferential side portion of an outer edge; and
   a second further protrusion and a third further protrusion,
   wherein the second further protrusion extends between the opening and a vertically upper portion of the outer edge and the third further protrusion extends between the opening and a vertically lower portion of the outer edge.

6. The wind turbine tower according to claim 1,
   wherein a thickness of the wall section increases from the outer edge towards the inner edge of the wall section.

7. The wind turbine tower according to claim 1,
   wherein the wall section comprises a convex surface and a concave surface, and
   wherein each of the plurality of protrusions is arranged at the concave surface.

8. The wind turbine tower according to claim 1,
   wherein the wall section has a shape of a cylinder segment.

9. The wind turbine tower according to claim 1,
   wherein the wall section comprises a cast metal.

10. The wind turbine tower wall section according to claim 1,
    wherein the cast metal comprises steel.

11. The wind turbine tower according to claim 1, further comprising at least one hole adapted for passage of air.

12. The wind turbine tower according to claim 1,
    wherein the tower wall portion is connected to the wall section by welding.

13. The wind turbine tower according to claim 1,
    wherein a further protrusion protrudes in the thickness direction and extends laterally between one of the side edge portions and the inner edge.

14. The wind turbine tower according to claim 1,
    wherein a further protrusion protrudes in the thickness direction and extends laterally between one of the side edge portions and the other side edge portion.

15. The wind turbine tower according to claim 1,
    wherein a thickness of each of the first protrusion and the second protrusion decreases in the transverse direction.

* * * * *